United States Patent
Shi

(10) Patent No.: US 11,811,806 B2
(45) Date of Patent: Nov. 7, 2023

(54) SYSTEM AND APPARATUS FOR INTERNET TRAFFIC INSPECTION VIA LOCALIZED DNS CACHING

(71) Applicant: Barracuda Networks, Inc., San Jose, CA (US)

(72) Inventor: Fleming Shi, Scotts Valley, CA (US)

(73) Assignee: Barracuda Networks, Inc., Campbell, CA (US)

( * ) Notice: Subject to any disclaimer, the term of this patent is extended or adjusted under 35 U.S.C. 154(b) by 175 days.

(21) Appl. No.: 17/247,355

(22) Filed: Dec. 8, 2020

(65) Prior Publication Data

US 2022/0103579 A1 Mar. 31, 2022

Related U.S. Application Data

(60) Provisional application No. 63/198,059, filed on Sep. 25, 2020.

(51) Int. Cl.
*G06F 21/00* (2013.01)
*H04L 9/40* (2022.01)
*H04L 61/4511* (2022.01)

(52) U.S. Cl.
CPC ...... *H04L 63/1425* (2013.01); *H04L 61/4511* (2022.05); *H04L 63/0236* (2013.01); *H04L 63/0281* (2013.01); *H04L 63/101* (2013.01); *H04L 63/105* (2013.01)

(58) Field of Classification Search
CPC ............. H04L 63/1425; H04L 61/4511; H04L 63/0236; H04L 63/0281; H04L 63/101; H04L 63/105
See application file for complete search history.

(56) References Cited

U.S. PATENT DOCUMENTS

| | | | |
|---|---|---|---|
| 8,521,888 B2 * | 8/2013 | Larson | H04L 63/168 709/227 |
| 2005/0235044 A1 * | 10/2005 | Tazuma | G06F 16/9574 709/217 |
| 2008/0147837 A1 * | 6/2008 | Klein | H04L 61/4511 709/223 |
| 2013/0036468 A1 * | 2/2013 | Georgiev | G06F 21/51 726/23 |
| 2014/0325045 A1 * | 10/2014 | Pechersky | H04L 63/0407 709/223 |
| 2016/0065611 A1 * | 3/2016 | Fakeri-Tabrizi | H04L 63/1441 726/23 |

(Continued)

*Primary Examiner* — Michael M Lee

(57) ABSTRACT

An approach is proposed to support Internet traffic inspection to detect and prevent access to blocked websites or resources. First, access requests initiated by users to websites hosted on servers over a network are intercepted by an inspection agent, which identifies and caches a pair of the domain/host name of each website and its corresponding IP address on the Internet to a localized DNS cache. When a newly intercepted access request identifies the website by its IP address only without specifying its domain/host name, the inspection agent looks up the domain name by its IP address from the DNS cache. If no domain name is found, the inspection agent redirects the access request to a proxy server instead of forwarding it to the server hosting the website for further inspection. The proxy server then inspects the IP address to determine if it is a legitimate website or not.

26 Claims, 2 Drawing Sheets

(56) References Cited

U.S. PATENT DOCUMENTS

| | | | |
|---|---|---|---|
| 2016/0119193 A1* | 4/2016 | Zhang | H04L 63/0281 709/224 |
| 2016/0173527 A1* | 6/2016 | Kasman | H04L 63/1458 726/23 |
| 2020/0314064 A1* | 10/2020 | Lee | H04L 61/4511 |
| 2020/0374262 A1* | 11/2020 | Hoewisch | H04W 12/08 |
| 2021/0400080 A1* | 12/2021 | Kaidi | H04L 63/0281 |

* cited by examiner

SYSTEM AND APPARATUS FOR INTERNET TRAFFIC INSPECTION VIA LOCALIZED DNS CACHING

CROSS-REFERENCE TO RELATED APPLICATIONS

This application claims the benefit of U.S. Provisional Patent Application No. 63/198,059, filed Sep. 25, 2020, which is incorporated herein in its entirety by reference.

BACKGROUND

Domain Name System (DNS) is a hierarchical and decentralized naming system for computers, services, or other resources connected to the Internet or a private network. The DNS associates various information with domain/host names assigned to each of the participating entities on the Internet. Specifically, the DNS translates more readily memorized domain names, such as names of websites in the forms of .com, .edu, org, etc. to numerical IP addresses needed for locating and identifying computer services and devices hosting the websites with the underlying network protocols. The DNS is a central part of the Internet as it enables human users to access websites, resources, and services hosted at IP addresses on the Internet via memorable domain/host names.

With the exponential growth of Internet/IP/web traffic, cyberattacks launched by hackers targeting the Internet users have become an increasing concern. In some cases, the hackers hijack the Internet traffic by directing or redirecting the IP traffic initiated by the users to illegitimate/malicious/blocked IP addresses hosting malicious websites or resources under their control. As a result, malicious software and/or virus may be installed on the users' computing devices and/or the users' identification, credentials, and/or personal information may be stolen or comprised. Thus, it is important to block the Internet traffic directed to those malicious websites or resources.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
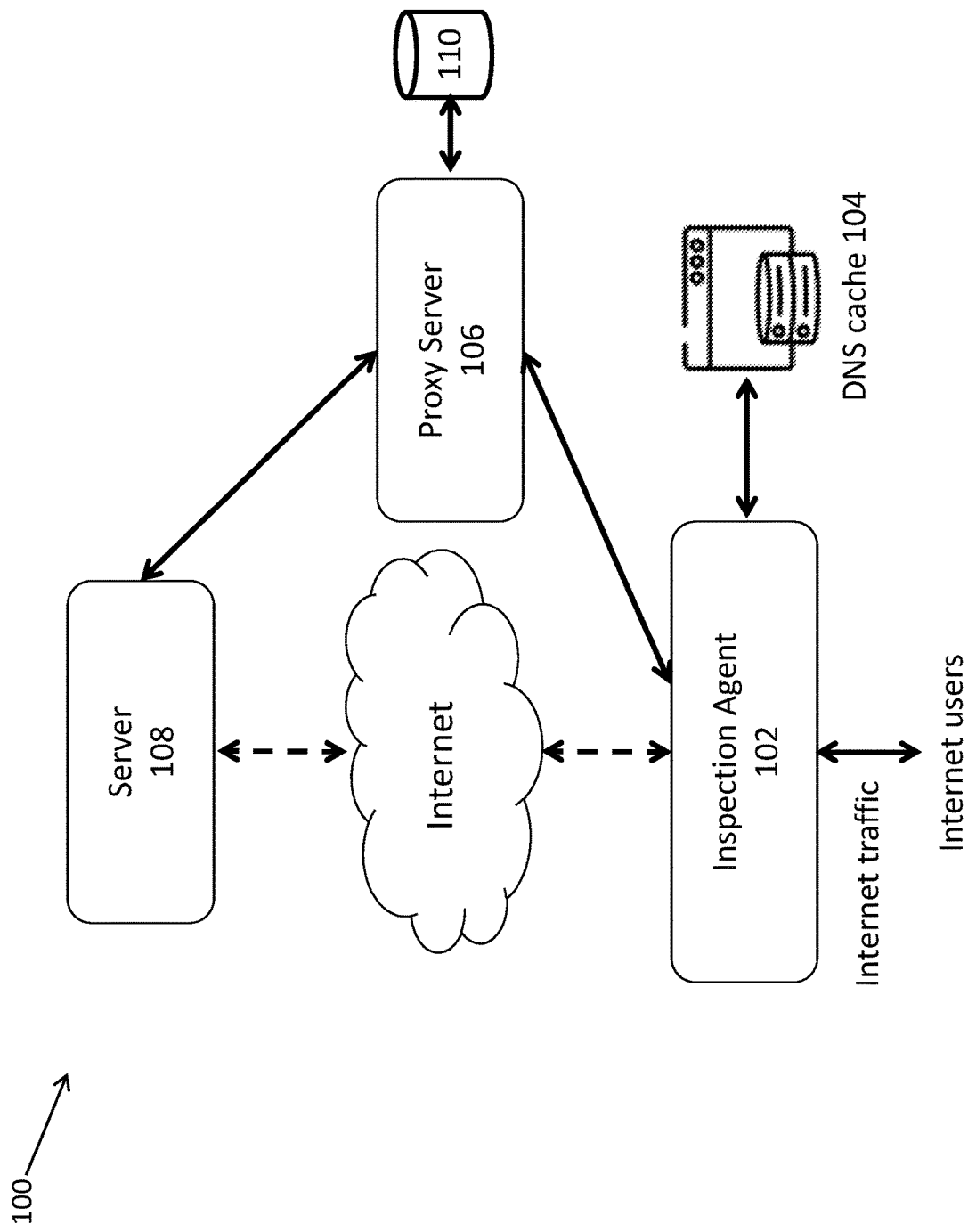
FIG. 1 depicts an example of a system diagram to support Internet traffic inspection via localized DNS caching in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support Internet traffic inspection to detect and prevent access to blocked websites or resources. First, Internet traffic initiated by one or more users in the form of access requests to websites (or services or resources) hosted on servers over a network is intercepted by an inspection agent, which identifies and caches a pair of the domain/host name of each website and its corresponding IP address on the Internet to a localized DNS cache. When a newly intercepted access request identifies the website by its IP address only without specifying its domain/host name, the inspection agent looks up the domain name of the website by its IP address from the DNS cache. If no domain name is found, the inspection agent redirects the access request to a proxy server instead of forwarding it to the server hosting the website for further inspection. The proxy server then inspects the IP address of the access request to determine if it is a legitimate website or not. The proxy server will forward the redirected access request to the server hosting the website if the IP address is determined to be legitimate. Otherwise, the proxy server will take remedial actions on the redirected access request.

By checking and identifying the domain name associated with the access request via a localized DNS cache when such domain name is not explicitly specified, the proposed approach prevents users from accessing potentially suspicious websites or resources on the Internet. Under the proposed approach, a user who initiates an access request to a suspicious website or resource via its IP address only (for a nonlimiting example, when the user accidentally clicks a link embedded in a malicious email or electronic message), the user will be blocked from accessing the website if the IP address of the website is determined to be suspicious. As such, potential cyberattacks launched by the hackers via those malicious websites or resources are prevented. Note that besides blocking the IP address only Internet traffic, many other remedial actions can also be taken by the proxy server to mitigate the threats or cyberattacks launched by the hackers.

As used hereinafter, the term "user" (or "users") refers not only to a person or human being, but also to an organization, a group of organizations, a country, and even a continent that may initiate the access request to a website or resource and be subject to a cyberattack.

FIG. 1 depicts an example of a system diagram 100 to support Internet traffic inspection via localized DNS caching. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes one or more of an inspection agent/component 102, a DNS cache 104, and a proxy server 106. These components in the system 100 each runs on one or more computing units/appliances/devices/hosts (not shown) each with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units, which becomes a special purposed one for practicing the processes. The processes may also be at least partially embodied in the computing units into which computer program code is loaded and/or executed, such that, the host becomes a special purpose computing unit for practicing the processes.

In the example of FIG. 1, each computing unit can be a computing device, a communication device, a storage device, or any computing device capable of running a software component. For non-limiting examples, a computing device can be but is not limited to a server machine, a laptop PC, a desktop PC, a tablet, a Google's Android device, an iPhone, an iPad, and a voice-controlled speaker or controller. Each computing unit has a communication interface (not shown), which enables the computing units to communicate with each other, the user, and other devices over one or more communication networks following certain communication protocols, such as TCP/IP, http, https, ftp, and sftp protocols. Here, the communication networks can be but are not limited to, Internet, intranet, wide area network (WAN), local area network (LAN), wireless network, Bluetooth, WiFi, and mobile communication network. The physical connections of the network and the communication protocols are well known to those of skilled in the art.

In the example of FIG. 1, the inspection agent 102 is configured to constantly monitor and intercept Internet traffic from one or more users in the form of one or more access requests, e.g., HTTP requests, to access certain websites/resources/services hosted on one or more server 108s on the Internet. In some embodiments, the inspection agent 102 resides and runs on the same device or endpoint used by the users to initiate the access requests. In some embodiments, the inspection agent 102 runs at a gateway or firewall of a local area network (LAN) of a business entity to monitor and intercept all Internet traffic originated by the users within the business entity. In some embodiments, the inspection agent 102 is located and runs on a networking device such as a router to monitor and intercept all user originated Internet traffic routed or transmitted through the networking device.

In some embodiments, for each access request intercepted, the inspection agent 102 is configured to identify and retrieve a pair of domain/host name of the website or resource to be accessed and the corresponding IP address of the server 108 hosting the website or resource the access requests. Here, the domain/host name can be a fully qualified domain name (FQDN), which is a domain name that specifies its exact location in a DNS tree hierarchy including all domain levels from the top-level domain. The FQDN is a complete domain name for a specific computing device or host on the internet. In some embodiments, the domain name can be an abbreviation or subset of a FQDN, such as one shortened for mobile access. In some embodiments, the domain name is an alias of the server hosting the website. In some embodiments, the domain name may not conform to an Internet protocol such as a Request for Comments (RFC) protocol.

In some embodiments, the inspection agent 102 is configured to save the pair of (domain name, IP address) into the DNS cache 104 if such pair is not in the DNS cache 104 yet. Here, the DNS cache 104 is a storage mechanism configured to maintain locally with the inspection agent 102 a list of (domain name, IP address) pairs that the users have requested to access as monitored by the inspection agent 102. In some embodiments, the list of (domain name, IP address) pairs are maintained in the form of one or more tables. In some embodiments, the DNS cache 104 is configured to be searched and looked up by the inspection agent 102 via either the IP address (to obtain the corresponding domain name) or the domain name (to obtain the corresponding IP address). In some embodiments, when a new access request is intercepted by the inspection agent 102 and if the newly intercepted access request contains only an IP address without the corresponding domain name of the website or resource, the inspection agent 102 is configured to look up the domain name from the DNS cache 104 via the IP address in the newly intercepted access request. If the domain name of the newly intercepted access request is found in the DNS cache 104, the inspection agent 102 adds a new pair of (domain name, IP address) into the DNS cache 104 and the newly intercepted access request is forwarded/directed to the server 108 hosting the website or resource. If no domain name corresponding to the IP address is found in the DNS cache 104, however, the inspection agent 102 is configured to redirect and/or route the access request to the proxy server 106 for further inspection instead of forwarding the access request to the server 108.

In the example of FIG. 1, the proxy server 106 is configured to accept the redirected access request, which domain name has not been found by the inspection agent 102, and analyze the redirected access request to determine if it attempts to access a malicious website or resource or not. In some embodiments, the proxy server 106 is configured to search a block database 110, which maintains the IP addresses of a list of websites and resources that are known to be malicious and have been put on a block list. If an entry is found for the IP address of the redirected access request in the block database 110, indicating that the IP address points to a malicious website or source, the proxy server 106 is configured to take remedial actions including but not limited to blocking the redirected access request, and to report back to the inspection agent 102 that the user is attempting to access a malicious website or resource. The inspection agent 102 will then inform the user who initiates the access request accordingly. If no entry is found for the IP address of the redirected access request in the block database 110 and/or the IP address is not found to be hosting a malicious website or resource, the proxy server 106 is configured to forward the redirected access request to the corresponding server 108 hosting the requested website or resource at the IP address.

In some embodiments, the proxy server is configured to take various remedial actions on the redirected Internet traffic in addition to or instead of blocking the redirected request by, e.g., quarantining or sandboxing the redirected request, if it is determined that the access request is to access a malicious website or resource. In some embodiments, the proxy server is configured to continuously monitor and/or audit any and/or every redirected IP address only access request to validate packet and/or content of such redirected IP address only access request. In some embodiment, the proxy server is configured to inspect all packets and contents of the IP address-only access requests for various malicious and/or evasive behaviors and to delete or quarantine such traffic if any malicious and/or evasive behavior is found.

Figure 2:
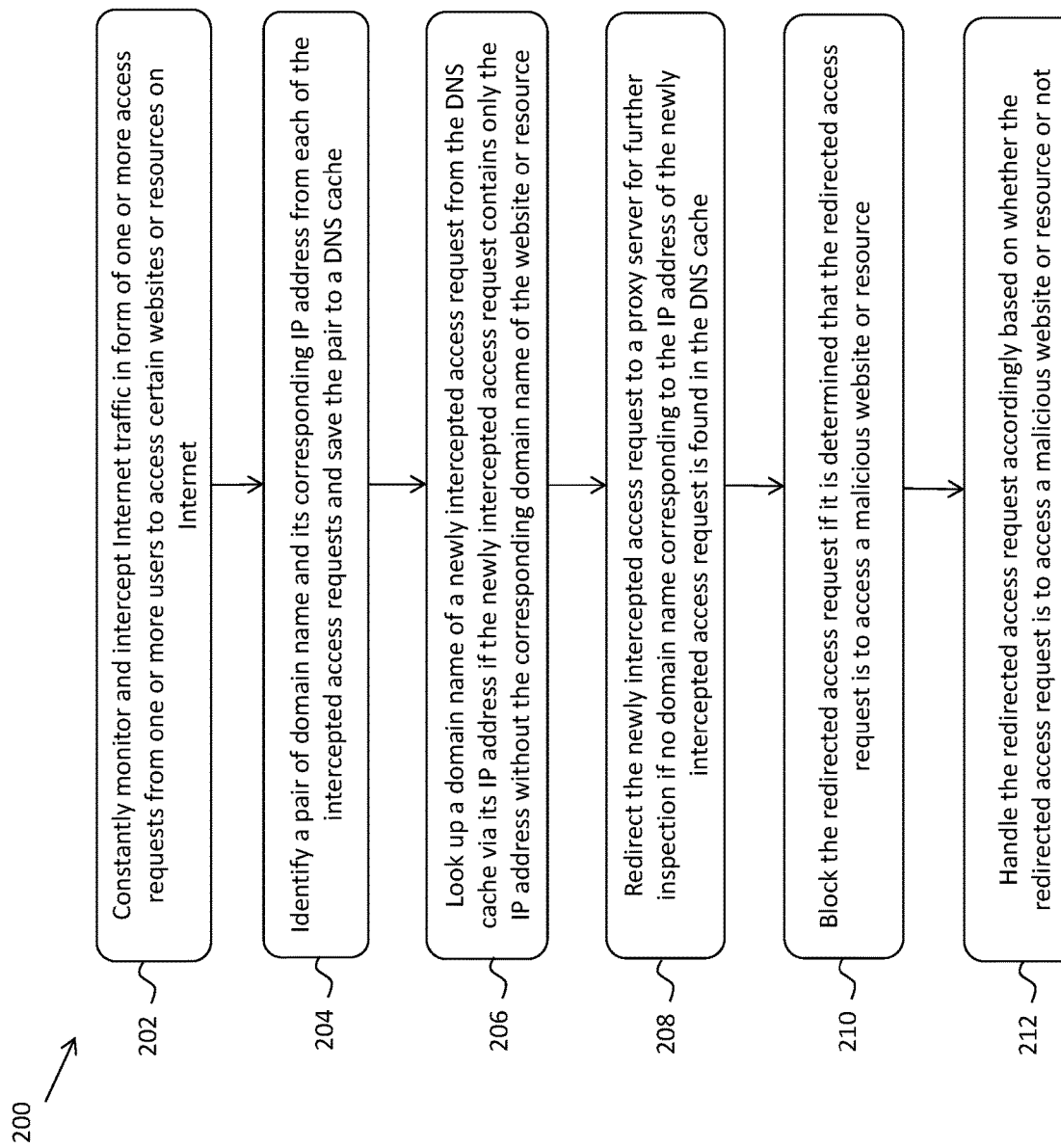
FIG. 2 depicts a flowchart of an example of a process to support Internet traffic inspection via localized DNS caching in accordance with some embodiments.

FIG. 2 depicts a flowchart 200 of an example of a process to support Internet traffic inspection via localized DNS caching. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where Internet traffic in form of one or more access requests from one or more users to access certain websites or resources on Internet is constantly monitored and intercepted. The flowchart 200 continues to block 204, where a pair of domain name and its corresponding IP address is identified from each of the intercepted access requests and saved to a DNS cache. The flowchart 200 continues to block 206, where a domain name of a newly intercepted access request is looked up from the DNS cache via its IP address if the newly intercepted access request contains only the IP address without the corresponding domain name of the website or resource. The flowchart 200 continues to block 208, where the newly intercepted access request is redirected to a proxy server for further inspection if no domain name corresponding to the IP address of the newly intercepted access request is found in the DNS cache. The flowchart 200 continues to block 210, where the redirected access request is blocked if it is determined that the redirected access request is to access a malicious website or resource. The flowchart 200 ends at block 212, where the redirected access request is handled accordingly based on whether the redirected access request is to access a malicious website or resource or not.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support Internet traffic inspection, comprising:
a networking component; and
an inspection component communicatively coupled to the networking component,
wherein the inspection component is configured to
constantly monitor and intercept Internet traffic in form of one or more access requests from one or more users to access certain websites or resources hosted on a server on Internet;
identify a pair of domain name and its corresponding IP address from each of the intercepted one or more access requests and save the pair to a Domain Name System (DNS) cache;
look up a domain name of a newly intercepted access request from the DNS cache via an IP address of the newly intercepted access request if the newly intercepted access request contains only the IP address without corresponding domain name;
redirect the newly intercepted access request to a proxy server for further inspection if no domain name corresponding to the IP address of the newly intercepted access request is found in the DNS cache;
said proxy server configured to
determine whether the redirected newly intercepted access request into access a malicious website or resource or not;
handle the redirected newly intercepted access request accordingly based on whether the redirected newly intercepted access request is to access the malicious website or resource or not.

2. The system of claim 1, further comprising:
said DNS cache configured to maintain locally a list of domain name/IP address pairs that the one or more users have requested to access as monitored by the inspection component.

3. The system of claim 2, wherein:
the list of domain name/IP address pairs is maintained in form of one or more tables.

4. The system of claim 2, wherein:
the DNS cache is configured to be searched and looked up via either the IP address or the domain name.

5. The system of claim 1, wherein:
the inspection component runs on the same device or endpoint used by the one or more users to initiate the one or more access requests.

6. The system of claim 1, wherein:
the inspection component runs at a gateway or firewall of a local area network (LAN) of a business entity to monitor and intercept all Internet traffic originated by the one or more users within the business entity.

7. The system of claim 1, wherein:
the domain name is a fully qualified domain name (FQDN), which is a domain name that specifies its exact location in a DNS tree hierarchy including all domain levels from a top-level domain.

8. The system of claim 7, wherein:
the domain name is an abbreviation or subset of the FQDN shortened for mobile access.

9. The system of claim 1, wherein:
the domain name is an alias of the server hosting the website.

10. The system of claim 1, wherein:
the domain name is non-conforming to an Internet protocol.

11. The system of claim 1, wherein:
the inspection component is configured to add a new pair of domain name/IP address into the DNS cache and forward the newly intercepted access request to the server hosting the website or resource if the domain name of the newly intercepted access request is found in the DNS cache.

12. The system of claim 1, wherein:
the proxy server is configured to search a block database via the IP address of the redirected newly intercepted access request to determine whether the IP address points to a malicious website or source or not, wherein the block database maintains IP addresses of a list of websites and resources that are known to be malicious and have been put on a block list.

13. The system of claim 1, wherein:
the proxy server is configured to mitigate threats or cyberattacks launched via the redirected newly intercepted access request and report back to the inspection component that the redirected newly intercepted access request is attempting to access a blocked website or resource if an entry is found for the IP address of the redirected newly intercepted access request in a block database.

14. The system of claim 1, wherein:
the proxy server is configured to forward the redirected newly intercepted access request to the server hosting the requested website or resource at the IP address if no entry is found for the IP address of the newly intercepted access request in a block database.

15. The system of claim 1, wherein:
the proxy server is configured to continuously monitor and/or audit every redirected IP address-only access request to validate packet and/or content of the redirected IP address-only access request.

16. The system of claim 15, wherein:
the proxy server is configured to
  inspect packet and/or contents of the redirected IP address-only access request for various malicious and/or evasive behaviors;
  block, delete or quarantine the IP address-only access request if any malicious and/or evasive behavior is found.

17. A method to support Internet traffic inspection, comprising:
  constantly monitoring and intercepting Internet traffic in form of one or more access requests from one or more users to access certain websites or resources hosted on a server on Internet via an inspection component;
  identifying a pair of domain name and its corresponding IP address from each of the intercepted one or more access requests and save the pair to a Domain Name System (DNS) cache;
  looking up a domain name of a newly intercepted access request from the DNS cache via an IP address of the newly intercepted access request if the newly intercepted access request contains only the IP address without a corresponding domain name;
  redirecting the newly intercepted access request to a proxy server for further inspection if no domain name corresponding to the IP address of the newly intercepted access request is found in the DNS cache;
  determining, at the proxy server, whether the redirected newly intercepted access request is to access a malicious website or resource or not;
  handling, at the proxy server, the redirected newly intercepted access request accordingly based on whether the redirected newly intercepted access request is to access the malicious website or resource or not.

18. The method of claim 17, further comprising:
maintaining locally a list of domain name/IP address pairs that the one or more users have requested to access as monitored by the inspection component in the DNS cache.

19. The method of claim 18, further comprising:
maintaining the list of domain name/IP address pairs in form of one or more tables.

20. The method of claim 18, further comprising:
searching and looking up the DNS cache via either the IP address or the domain name.

21. The method of claim 17, further comprising:
adding a new pair of domain name/IP address into the DNS cache and forward the newly intercepted access request to the server hosting the website or resource if the domain name of the newly intercepted access request is found in the DNS cache.

22. The method of claim 17, further comprising:
searching a block database via the IP address of the redirected newly intercepted access request to determine whether the IP address points to a malicious website or source or not, wherein the block database maintains IP addresses of a list of websites and resources that are known to be malicious and have been put on a block list.

23. The method of claim 17, further comprising:
mitigating threats or cyberattacks launched via the redirected newly intercepted access request and reporting back to the inspection component that the redirected newly intercepted access request is attempting to access a blocked website or resource if an entry is found for the IP address of the redirected access request in a block database.

24. The method of claim 17, further comprising:
forwarding the redirected newly intercepted access request to the server hosting the requested website or resource at the IP address if no entry is found for the IP address of the newly intercepted access request in a block database.

25. The method of claim 17, further comprising:
continuously monitoring and/or auditing every redirected IP address only access request to validate packet and/or content of the redirected IP address-only access request.

26. The method of claim 25, further comprising:
inspecting packet and/or contents of the redirected IP address-only access request for various malicious and/or evasive behaviors;
blocking, deleting or quarantining the redirected IP address-only access request if any malicious and/or evasive behavior is found.

* * * * *